United States Patent [19]

Cascino

[11] Patent Number: 4,806,404

[45] Date of Patent: Feb. 21, 1989

[54] SELF-ADHERENT SPACER FOR FRAGILE OBJECTS

[75] Inventor: Lawrence A. Cascino, South Bend, Ind.

[73] Assignee: Gaska Tape, Inc., Elkhart, Ind.

[21] Appl. No.: 26,956

[22] Filed: Mar. 17, 1987

[51] Int. Cl.$^4$ .................. A61L 15/00; B32B 1/08; B32B 7/06; B32B 7/12

[52] U.S. Cl. ................... 428/40; 428/317.3

[58] Field of Search ............ 428/40, 314.4, 317.3, 428/317.7, 436; 206/454, 814

[56] References Cited

U.S. PATENT DOCUMENTS

| | | | |
|---|---|---|---|
| 3,362,609 | 1/1968 | Freedy | 206/454 |
| 3,380,582 | 4/1968 | Moyer, Jr. et al. | 428/314.4 |
| 4,131,700 | 12/1978 | Guglielmo, Sr. | 428/314.4 |
| 4,484,574 | 11/1984 | DeRusha et al. | 428/317.3 |
| 4,487,872 | 12/1984 | Takemoto et al. | 524/127 |
| 4,509,999 | 4/1985 | Sandor | 428/40 |
| 4,569,872 | 2/1986 | Miller | 428/314.4 |
| 4,663,362 | 5/1987 | Koebisu et al. | 521/134 |
| 4,699,146 | 10/1987 | Sieverding | 522/79 |

FOREIGN PATENT DOCUMENTS 1586482 3/1981 United Kingdom ............... 206/454

Primary Examiner—Nancy A. B. Swisher
Attorney, Agent, or Firm—Thomas J. Dodd

[57] ABSTRACT

A spacer member for positioning between fragile objects, such as glass panels, during shipment. The spacer includes a tack layer of sufficient adhesive properties to allow the spacer to adhere to the surface of the fragile object without the use of a surface tape.

10 Claims, 1 Drawing Sheet

U.S. Patent  Feb. 21, 1989  4,806,404
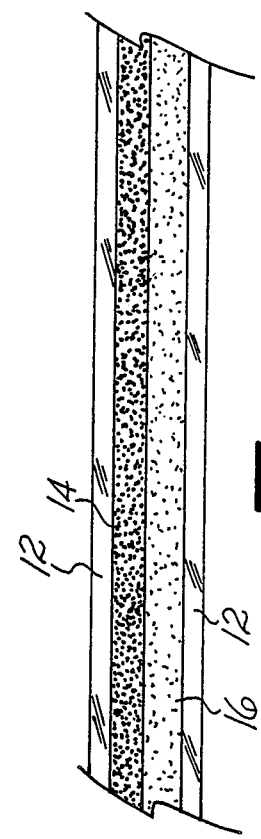
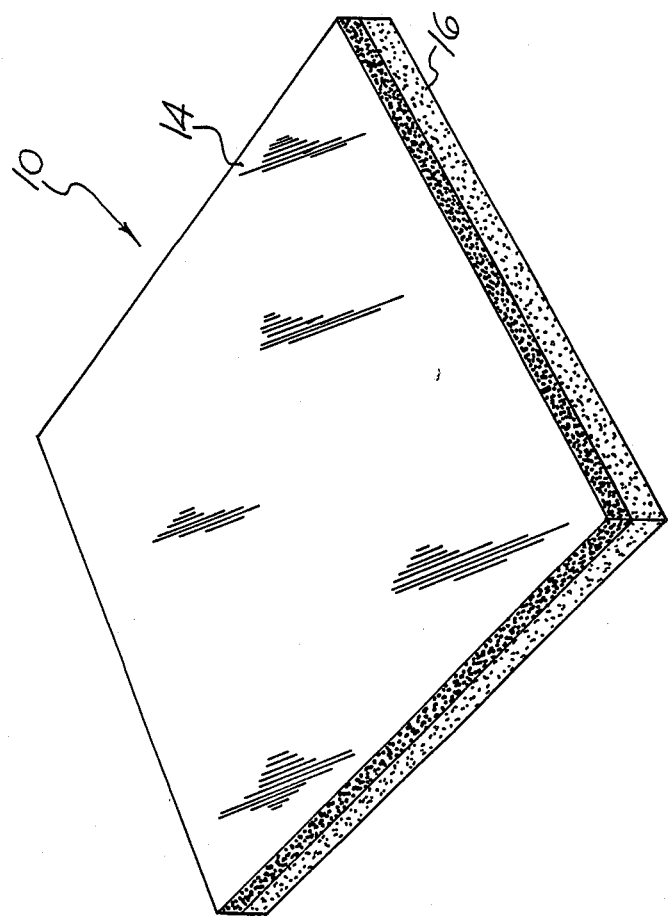

SELF-ADHERENT SPACER FOR FRAGILE OBJECTS

SUMMARY OF THE INVENTION

This invention relates to spacers and will have special but not limited application to spacers which adhere to fragile objects during shipment.

Bulk shipment of fragile objects, such as glass, requires the presence of spacers between the objects to protect against damage during shipping. It is normally desirable that the spacers adhere to the object to prevent movement during shipping which insures proper spacing of the objects. Until now, this has been accomplished by affixing adhesive tape to the spacers, with the result that the object often had to be washed by the receiver to remove adhesive residue which accumulated during shipping.

The spacer of this invention includes a layer of base material bonded directly to a tack layer. The tack layer is formed from a material which adheres to most fragile objects (such as glass, porcelain, etc.) but which leaves no adhesive residue on the object surface when removed.

Accordingly, it is an object of this invention to provide for an improved spacer which is for spacing fragile objects during shipment.

Another object of this invention is to provide for a fragile object spacer which adheres to the object but leaves no chemical residue on the object surface when removed.

Another object of this invention is to provide for a fragile object spacer which is efficient, economical and is easily disposable after use.

Another object of this invention is to provide for a fragile object spacer which possesses sufficient tack to prevent sliding movement during shipment, but is easily removed by the receiver.

Other objects of this invention will become apparent upon a reading of the following description.

BRIEF DESCRIPTION OF THE DRAWINGS

A preferred embodiment of the invention has been depicted for illustrative purposes wherein:

FIG. 1 is a perspective view of the spacer of this invention.

FIG. 2 is a fragmentary sectional view showing two fragile objects with the spacer of this invention positioned therebetween.

DESCRIPTION OF THE PREFERRED EMBODIMENT

The preferred embodiment herein described is not intended to be exhaustive or to limit the invention to the precise form disclosed. It is chosen and described to explain the principles of the invention, and its application and practical use so that others skilled in the art may utilize the invention.

Referring now to the drawings, reference numeral 10 generally refers to the spacer member of this invention which is adapted for positioning between a pair of fragile objects, such as glass panels 12, during shipment. Spacer member 10 includes a first or base cushion layer 14 and a second or tack layer 16 which is permanently bonded to the first layer.

Layer 14 is preferably formed of a semi-rigid polymeric material such as closed cell polyethylene, but any material sufficient to provide a backing for layer 16 which does not scratch glass panels 12 may be used to form layer 14. Layer 16 is preferably formed of a foamable polymer material such as foamable polyvinyl chloride, foamable polyurethane, or the like. An excess amount of a plasticizer such as a phthalate based compound is added to the polymeric base material to allow layer 16 to demonstrate high tack qualities. Preferably, the plasticizer accounts for at least 40% of tack layer 16 by weight but lower plasticizer concentrations may be sufficient in some applications depending upon the plasticizer and foamable resins used. Other compounds may be added to the mixture for stabilizing purposes. A release paper (not shown) of conventional composition adjacently overlies tack layer 16 and prevents adhesion of spacer 10 until desired. The following example is indicative of the materials used to form spacer member 10.

EXAMPLE

The following compounds were mixed together: 100.0 parts of a foamable polyvinyl chloride resin (PVC), 140.0 parts of a phthalate plasticizer, 14.4 parts of a blowing agent plasticizer mix, 1.5 parts of an activator stabilizer and 1.0 parts of a cell stabilizer. A uniform mixture was cast at a height of 0.025 inch on conventional adhesive release paper, and chemically expanded by heating to approximately 385° F. Acrylic adhesive was applied to a closed cell polyethylene foam and allowed to dry. The PVC-plasticizer foam was then laminated to the polyethylene foam by passing through nip rollers.

It is understood that all chemicals used in forming both the tack layer 16 and the base cushion layer 14 are well known to those skilled in the art and that modifications may be made in the formula or the process without departing from the spirit of the invention which is commensurate in scope with the following claims.

I claim:

1. A spacer member adapted to be positioned between fragile objects during shipment, said spacer member comprising a base cushion layer having first and second opposite contacting surfaces, a tack layer bonded to one of said base cushion layer contact surfaces, said tack layer formed of a soft material normally non-adherent to a smooth surface, said tack layer being modified to possess adhesive properties sufficient to adhere to a surface of said fragile object without leaving an appreciable adhesive residue when the spacer is removed, said tack layer formed of a soft plasticized polymeric material having organic plasticizer incorporated therein in amounts exceeding the normal quantity of plasticizer needed to soften said polymeric material.

2. The spacer member of claim 1 wherein said base cushion layer is formed of closed cell polyethylene.

3. The spacer member of claim 1 wherein said tack layer is formed of one of the group of materials which includes foamable polyvinyl chloride and foamable polyurethane.

4. A spacer member for positioning between fragile objects during shipment which leaves no appreciable adhesive residue when removed, said spacer member comprising:

(a) A first layer of expandable semi-rigid material; and (b) A second layer bonded to said first layer wherein said second layer is formed of plasticized polymeric material which includes additional organic plasticizer incorporated therein whereby said second layer is of sufficient tack to adhere to said fragile object without a separate surface adhesive.

5. The spacer member of claim 4 wherein said first layer is formed of closed cell polyethylene.

6. The spacer member of claim 4 wherein said second layer is formed of one of the group of materials which includes foamable polyvinyl chloride and foamable polyurethane.

7. The spacer member of claim 6 wherein said organic plasticizer is a phthalate based compound and constitutes at least 40% by weight of said second layer.

8. The spacer member of claim 6 wherein said organic plasticizer constitutes at least 52% by weight of said second layer.

9. A method of stacking fragile objects for shipment comprising the steps of:
   (a) providing a spacer member according to the teachings of claim 1;
   (b) pressing said tack layer into contact with a surface of a said fragile object; and
   (c) positioning a second said fragile object atop said spacer member adjacently overlying said base cushion layer wherein said second fragile object is spaced from said first-mentioned fragile object.

10. The method of claim 9 wherein said fragile objects are glass panels.

* * * * *